United States Patent
Zwick et al.

(10) Patent No.: US 6,377,576 B1
(45) Date of Patent: Apr. 23, 2002

(54) TELEPHONE CALL SETUP PROCEDURE

(75) Inventors: Nicholas Zwick, Far Hills; Howard Bubb, Mountain Lakes, both of NJ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/541,678

(22) Filed: Oct. 10, 1995

(51) Int. Cl.[7] .......................... H04L 12/66; H04L 12/54
(52) U.S. Cl. ...................... 370/389; 370/352; 379/209
(58) Field of Search .................. 379/207, 209, 379/218, 219, 220.01, 221.01, 229, 230, 223, 224, 90.01, 93.01, 112, 114, 115; 370/389, 392, 352, 485, 401, 404, 396, 458, 384, 385

(56) References Cited

U.S. PATENT DOCUMENTS

| | | | |
|---|---|---|---|
| 4,600,814 A | | 7/1986 | Cunniff et al. ................. 379/94 |
| 4,771,425 A | * | 9/1988 | Baran et al. ................. 370/458 |
| 4,953,159 A | * | 8/1990 | Hayden ....................... 370/260 |
| 5,425,084 A | * | 6/1995 | Brinskele .................... 379/112 |
| 5,553,124 A | * | 9/1996 | Brinckele .................... 379/112 |
| 5,602,846 A | * | 2/1997 | Homquist et al. .......... 370/384 |
| 5,604,737 A | * | 2/1997 | Iwami et al. ................ 370/351 |
| 5,608,786 A | * | 3/1997 | Gordon ....................... 379/100 |
| 5,818,836 A | * | 10/1998 | Duval ......................... 370/351 |
| 5,852,656 A | * | 12/1998 | Sato ............................ 379/202 |
| 5,943,399 A | * | 8/1999 | Bannister ................. 379/88.17 |

FOREIGN PATENT DOCUMENTS

| WO | WO92/01350 | * | 1/1992 | ................. 379/207 |

OTHER PUBLICATIONS

Yang, C., "RFC 1789: INETPhone–Telephone Services and Servers on Internet." Apr. 1995. °http://ds.internic.net/rfc/rfc1789.txtt21 (Feb. 12, 1997). Apr. 1995.*
Cerf, V., et al. "A Protocol for Packet Network Intercommunication." IEEE Transactions on Communications, vol. COM–22. No. 5, May 1974.*
Baran, P., "On Distributed Communications Networks." IEEE Transactions on Communications Systems, manuscript received Oct. 1963. Mar. 1964.*
Aras. C., et al. "Real–Time Communication in Packet–Switched Networks." Proceedings of the IEEE, vol. 82, No. 1, Jan. 1994.*

* cited by examiner

*Primary Examiner*—Wellington Chin
*Assistant Examiner*—Steven Nguyen
(74) *Attorney, Agent, or Firm*—Kaplan & Gilman, LLP

(57) ABSTRACT

An improved technique for connecting calls through a telephone network is disclosed wherein a data signal transmitted from a computer over- a separate network is used to instruct the telephone switch to make the desired connection.

6 Claims, 4 Drawing Sheets

TELEPHONE CALL SETUP PROCEDURE

TECHNICAL FIELD

This invention relates to telephony, and more particularly, to an improved technique for implementing the setup of telephone calls.

BACKGROUND OF THE INVENTION

A typical call setup procedure through a telephone network is accomplished by the initiator of the telephone call entering a desired number to be called, and the telephone switch arranging for a connection from the calling telephone to the called telephone. However, due to billing practices and varying rates among telephone companies, there are situations when this protocol is undesirable.

For example, due to time differences and/or local access rates, it may be less expensive for a first party in San Francisco to call a second party in New York at a particular time of day than it is for the second party in New York to call the first party in San Francisco at the same time. In international calling, often calls coming into the country are billed at a different rate than calls leaving the country. Thus, the direction that the call was made once again becomes critical in determining its price.

It can be appreciated that if the calling party and called party can agree between them who shall pay for the call, then it is not relevant, as a practical matter, which way the call is initiated, as long as a telephone connection between the two parties can be established. Accordingly, it can be appreciated that a significant cost savings can be achieved by deriving a technique whereby a calling party desiring to make a call to a called party can instruct the telephone network to place the call such that the minimum cost is incurred.

Presently, systems known as automatic callback exist, and are intended to minimize calling costs. To describe such systems, consider a first user in Brazil who wants to call a second user in New York. Presume it is much cheaper to call Brazil from New York than to call New York from Brazil.

The first user dials the automatic callback system, which is a computer located in the New York area, and hangs up after two rings. The computer, based upon the channel on which the incoming call arrived, knows the first caller's telephone number and calls that number back on a first telephone line. The computer then takes a second telephone line off hook, and sends the dial tone to the caller in Brazil by bridging the first and second lines. Thus, no call from Brazil to New York is made. Rather, a first call from New York to Brazil is made, and a second call is made from the computer to the second user. It can be appreciated that the user interface in such a system is quite cumbersome and becomes even more cumbersome if additional parties are desired to be added to the phone conversation.

There are also prior art systems which utilize a data network to conduct a voice conversation between two audio equipped terminals. Such systems however, do not utilize the PSTN.

SUMMARY OF THE INVENTION

The above and other problems of the prior art are overcome in accordance with the present invention which relates to a technique of minimizing the cost of a call by allowing a calling party to select whether the call is established as an incoming or an outgoing call. In accordance with the present invention, a hybrid switch is utilized which acts both as a telephone switch and a data switch. The switch has interface connections to both the public switched telephone network as well as wide area data networks, such as the Internet or similar such networks.

A calling party accesses the switch at a remote location via the data network and instructs the switch to utilize the public switched telephone network to form a connection from the called party back to the calling party. Thus, the telephone call that the calling party desires is accomplished as an incoming call through his local switch, rather than an outgoing call. Thus, costs are minimized.

DETAIL DESCRIPTION OF THE PREFERRED EMBODIMENT

Figure 1:
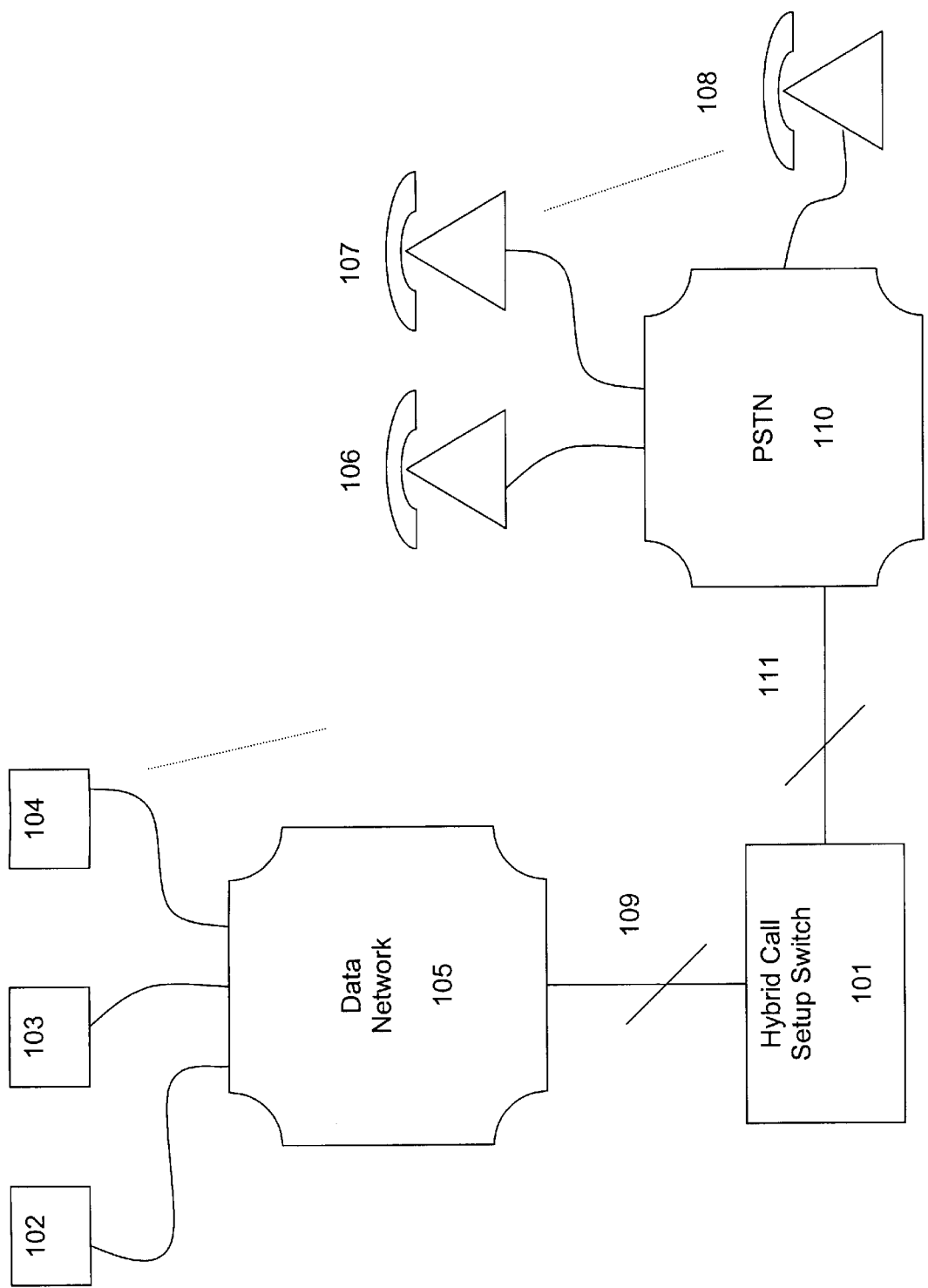
FIG. 1 shows a telephone and data network including an exemplary hybrid call setup switch in accordance with the present invention.

FIG. 1 shows a data network 105 with a plurality of computers 102 through 104 connected thereto. The data network may be, for example, the well known Internet, may be some other type of local area network or wide area network. Such networks are in wide spread use and the details of their operation, design, etc. are well known to those of ordinary skill in the art.

Hybrid call setup switch 101, to be fully described later herein, is connected to data network 105 via a plurality of connections 109, preferably entirely digital. Hybrid call setup switch 101 is also connected to public switched telephone network 110 via a plurality of telephone lines 111. The lines 111 may be multiple analog lines, one or more T1 links, etc. Public switched telephone network 110 is also well known to those of ordinary skill in the art and is intended to represent any portion of, or the entire, world wide telephone system. Also shown in FIG. 1 are a plurality of telephone devices 106 through 108 connected to the public switched telephone network in a normal and conventional fashion, it being indicated that there are other telephones which are not shown.

While one hybrid call setup switch 101 is shown, it is noted that the arrangement may include a plurality of hybrid call setup switches 101, each located at different parts of the public switched telephone network. For example, hybrid call setup switch 101 may be located in New York with a plurality of phones connected to public switched telephone network 110 through the numerous central office switches in the New York area. An additional hybrid call setup switch 101 may be located in California nearby the plurality of central office switches in Los Angeles.

For purposes of explanation herein, we presume that telephone 108 is located in New York, hybrid call setup switch 101 is also located in New York, and telephone 106 is located in Los Angeles. We also presume that at a particular time of day in question, it is less expensive to telephone Los Angeles from New York than to telephone New York from Los Angeles.

Considering the relevant time of day, and presuming that a Los Angeles user of telephone 106 desires to call a party in New York, the Los Angeles user knows that long distance rates make it less expensive to place a call from New York back to Los Angeles. Accordingly, the Los Angeles user approaches his personal computer 104 and transmits a message on the data network 105 to hybrid call setup switch 101 located in New York.

The New York call setup switch places a local call to telephone 108 and a long distance call over public switched telephone network 110 to telephone 106 in Los Angeles. These calls are accomplished as a normal telephone connection. Thus, the telephone connection between telephones 106 and 108 is accomplished not by a long distance call from telephone 106 to telephone 108, but rather, by a long distance call from hybrid call setup switch 101 to telephone 106, and a local call from hybrid call setup switch 101 to telephone 108. Since it is cheaper to call from hybrid call setup switch 101 to telephone 106, long distance charges are saved. The savings are sufficient to justify the additional cost of the local call from hybrid call setup switch 101 to telephone 108 as well as any minor charge incurred as a result of using the data network.

It is noted that due to the capability to convey call progress information over the data network 105, textual messages may be sent back to the computer of the originating caller and displayed on the screen thereof. Specifically, NIU 203, or some other portion of the system, may include the ability to recognize conditions such as ringing, no answer, busy, etc. Thus, if telephone 108 is busy, a message may be displayed on computer 104 stating that the called party's telephone is busy. Other status messages are possible as well.

In the above description, it was presumed that a separate personal computer 104 was utilized to communicate over data network 105 to hybrid call setup switch 101. In fact, the invention may be used for multipurpose terminals, whereby voice and data may be transmitted from the same terminal. For example, it is possible to have a terminal which connects to both the data network and the public switched telephone network, whereby a user simply dials the called party's number, but the terminal automatically connects the call through the data network in a manner as described above. Thus, the user simply selects the called party, and the computer decides whether the call is placed directly over the telephone line or partially over the data network as described herein. Whether or not a separate computer is used, or the computer and voice terminal are combined, is not critical to the present invention. Either of such devices is readily available off-the-shelf.

Figure 2:
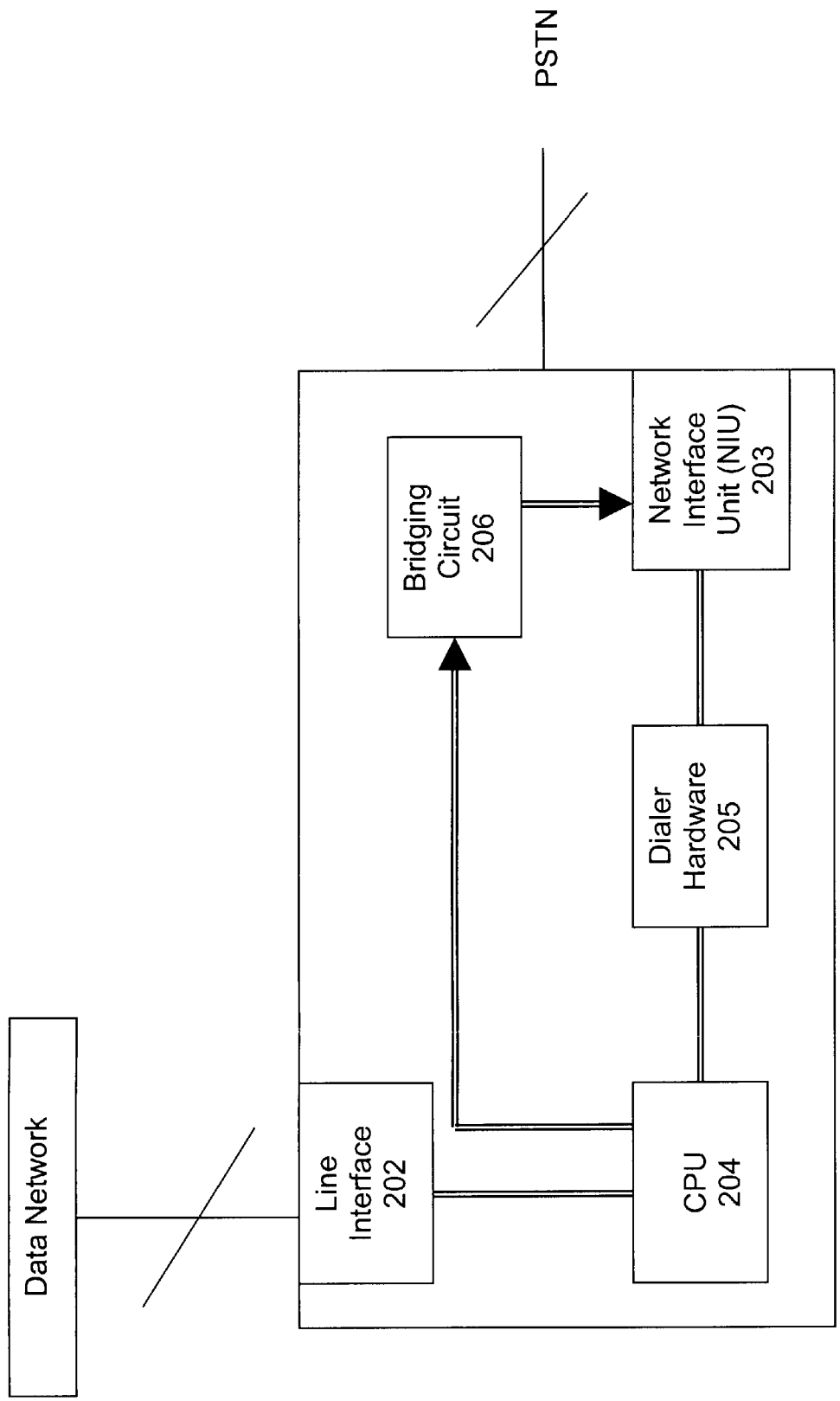
FIG. 2 shows a slightly more detailed block diagram of the call setup switch of FIG. 1.

FIG. 2 shows a slightly more detailed view of hybrid call setup switch 101. Hybrid call setup switch 101 includes a line interface 202 for communicating with data network 105, a CPU 204, dialer hardware 205, which may include tone generators and other miscellaneous hardware, a bridging circuit 206, and a network interface unit 203. The network interface unit is a standard piece of hardware available off the shelf for connecting to the public switched telephone network. A D/240SC-T1 is available from Dialogic Corporation of Parsippany, New Jersey and includes the appropriate hardware for implementing elements 203, 205, and 206 of FIG. 2.

Line interface unit 202 may actually include more than the simple interface circuitry to the data network. Rather, line interface 202 may include a modem and other additional functionality for implementing one or more communications protocols, such as HDLC, or even higher level protocols such as TCP/IP.

Additionally, the hardware and software of FIG. 2 may include typical switching capabilities such as conferencing of other parties, putting parties on hold, connecting parties to stored messages, disconnecting parties, or performing any other functions based upon commands received from the data network or the phone.

In operation, signals from any of computers 102 to 104 are received and demodulated, if necessary, through line interface unit 202 and transmitted to CPU 204 for processing. CPU 204 controls 10 the dialer hardware by instructing it to form a connection to the public switched telephone network, and to dial the appropriate number for the called party. Once the called party answers, the calling party is then telephoned, also through dialer hardware 205 and network interface unit 203. The network interface unit 203 then bridges the connection from the called party to the calling party so a telephone conversation can take place. Upon detecting the parties hanging up to end the connection, network interface unit 203 disconnects both telephone calls and the connection is ended. It is preferable that call progress (including disconnect detection) be implemented in the system, perhaps conveniently in NIU 203, and techniques for doing so are available off-the-shelf.

Whether the calling or called party is telephoned first by hybrid call setup switch 101 is not critical. Indeed, the user may optionally select which call is made first, or the selection can be made by the hybrid call setup switch 101 or any of computers 102–104 in accordance with cost or any other factors. Additionally, after one call is made but the other call has not yet been accomplished, a message can be played to the party who called first. Such message may be sent from hybrid call setup switch 101 and may be selectable by the user. The hold message can be played by reading it from a hard disk of a computer, through bridging circuit 206, and out NIU 203 to PSTN. The D/240SC-T1, as described earlier, provides a convenient way of implementing this.

The bridging of the connections together to complete the call may be accomplished in hardware or software. Concerning the hardware technique, bridging circuit 206 is connected to CPU 204 as shown. CPU 204 issues commands to bridging circuit 206 instructing it to form the appropriate connection, and bridging circuit 206 does so. Bridging circuit 206 may be a DMX product available from Dialogic Corporation, Parsippany, N.J., or may be any other similar hardware available in the industry.

Regarding the software technique, bridging circuit 206 would be unnecessary, and CPU 204 would instruct NIU 203 to transfer audio data digitally between the appropriate two channels. The SCbus architecture, known to those in this industry, is an acceptable technique for accomplishing this task in software.

It is noted that the connection between the two telephones need not be bridged through hybrid call setup switch 101 but rather, through one of the normal telephone switches contained within public switched telephone network 110. Specifically, hybrid call setup switch 101 can signal, via lines 111, one of the telephone switches in the public switched telephone network 110 to make the two calls and connect the parties. In such a case, the request to initiate the connection travels over both the telephone lines 111 and the data lines 109. The bridging of two lines through a telephone switch is known in the art.

Data network 105 is preferably a separate network from public switched telephone network 110. Networks 105 and 110 are separate in that (i) they have different subscriber communities, and (ii) different subscriber addressing schemes in that an address in one network has no meaning in the other network. In the present case, the primary purpose of data network 105 is to carry digital data, whereas the primary purpose of PSTN 110 is to carry voice. It is noted however, that the physical medium to carry the data may actually include portions of the physical PSTN.

Another embodiment contemplates that the completed call will be made directly from the telephone. Consider a first user that desires to call a second user. When CPU 204 receives the number of the telephone of the second user, it can send to that telephone a signal instructing it to call the first user over the telephone network. This can be accomplished in a similar fashion to the way Automatic Number Identification (ANI) protocols are used to convey a calling party's number without the called party answering the telephone. For example, the bit pattern that conveys the caller telephone number can be modified to convey the fact that callback is desired. When the receiving telephone receives the modified bit pattern, it does not ring the telephone, but rather, stores the received telephone number. The connection then ends and the called telephone, having now stored the calling party's telephone number, goes off hook and calls back the caller.

Figure 3:
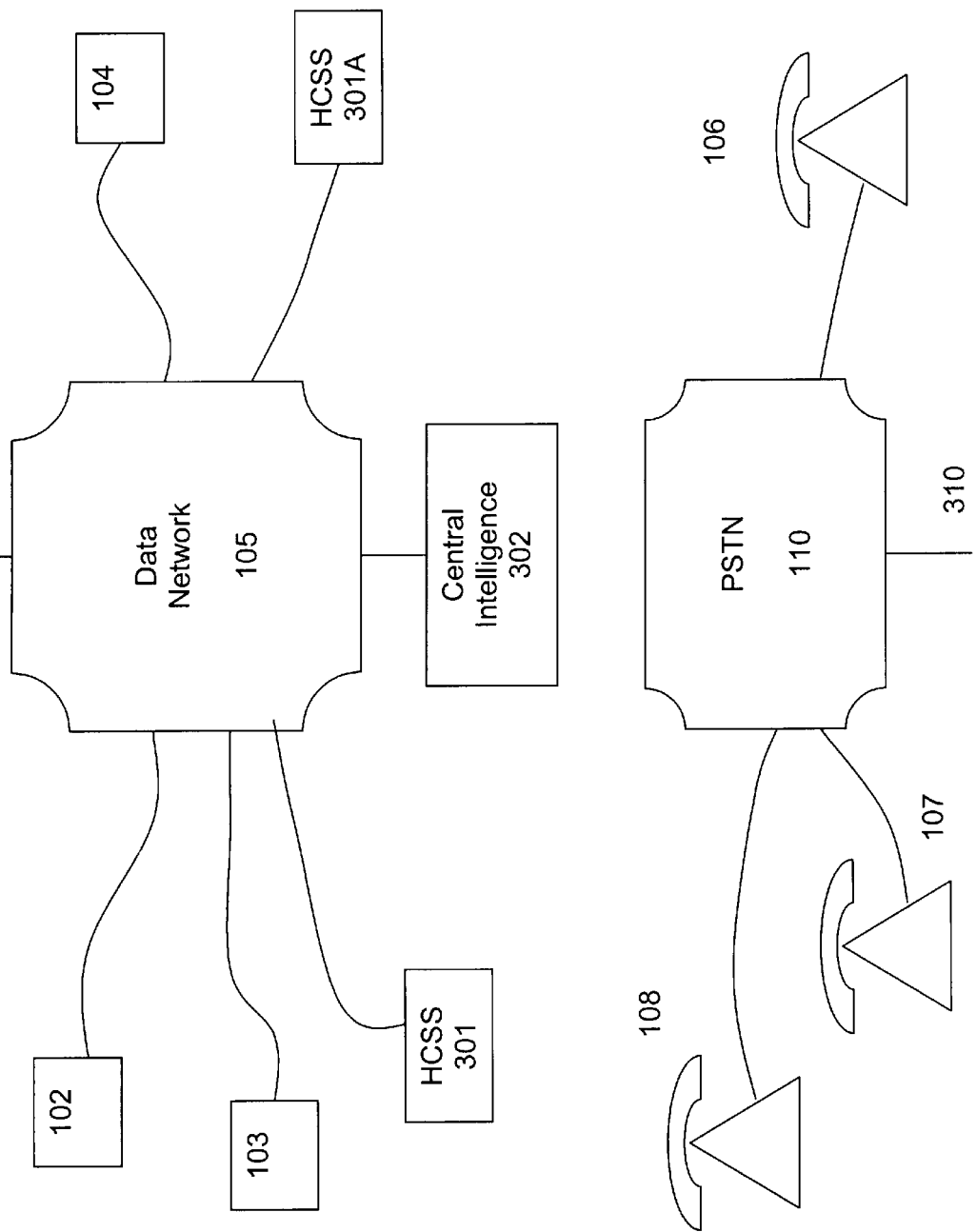
FIG. 3 shows an alternative embodiment of the present invention wherein the data network is used to carry audio signals.

FIG. 3 shows an alternative embodiment of the present invention wherein like numerals designate like components as in the other figures. The embodiment of FIG. 3 contemplates that data network 105 would be utilized to assist in implementation of a long distance call. The components to the left of the center line 310 are located in New York, while the components to the right of the center line 310 are located in Los Angeles.

In operation, a user of computer 104 in Los Angeles who desires to make a telephone call from his telephone 106 to a user in New York of telephone 108, issues an appropriate instruction from computer 104 to data network 105. The instruction may be issued by "clicking" an icon, or any other acceptable technique. The instruction is transmitted via data network 105 to switch 301, located in New York, which initiates a local telephone a hybrid call setup switch (HCSS) 301, through PSTN 110, to telephone 108. Additionally, HCSS 301 also issues an instruction, via data network 105, to HCSS 301a in Los Angeles. This latter instruction to HCSS 301a may optionally be issued directly from computer 104 or via one or more controlling computers 302. In any event, HCSS 301a then makes a local telephone call, via PSTN 110, to telephone 106.

Pursuant to the above protocol, it can be appreciated that two local telephone calls are made, a first being made from HCSS 301 to telephone 108, and a second from HCSS 301a to telephone 106. The two calls are then bridged, preferably through the data network, so that a long distance connection from telephone 106 to 108 exists. Accordingly, rather than the long distance call being implemented by one telephone call, the long distance call is implemented by two local telephone calls, and a separate long distance connection which is preferably implemented over data network 105.

It is also noted that the two HCSS 301 and 301a may be bridged by using techniques other than a data network. For example, the connection between HCSS 301 and 301a may be accomplished with dedicated lines, leased lines, virtual circuits, packetized voice circuits, or any combination thereof or other means of inexpensively connecting a user from Los Angeles to a user in New York while minimizing use of the public switched telephone network.

Figure 4:
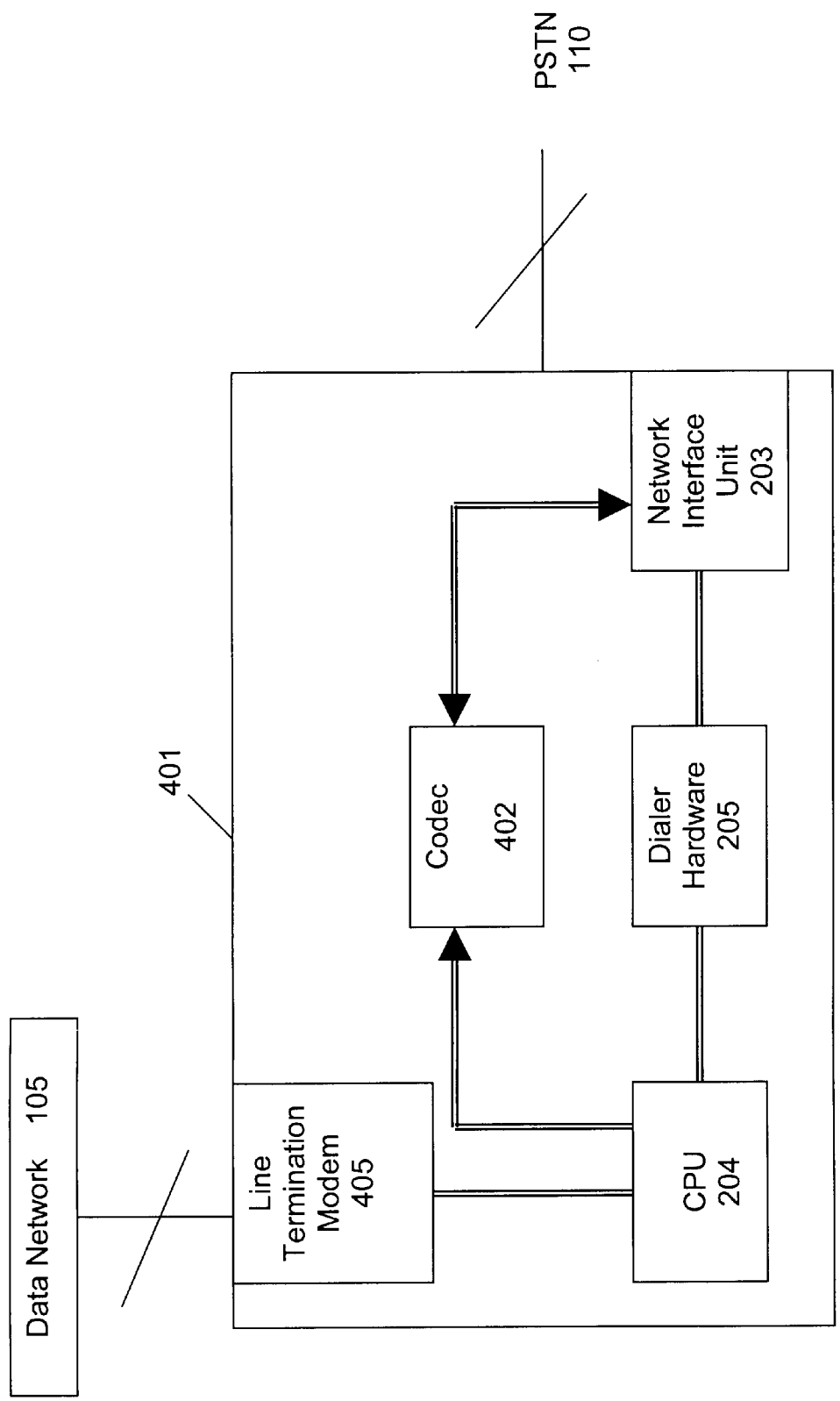
FIG. 4 shows a more detailed diagram of data/telephone switch of the present invention.

FIG. 4 shows a block diagram of the circuit card for use in HCSS 301 and 301a. The circuit card 401 includes a line termination and encoder/decoder card 405 for receiving and decoding data from the data network into digital bits. It is presumed that the incoming data from the data network is in the form of FSK, PSK, or other similar encoding technique although the type of encoding is not critical to the present invention. It is noted however, that the data rate of line termination and encoder/decoder 405 should be sufficient to transmit and receive real time voice as transmitted and received by codec 402.

CPU 204 is arranged to control dialer hardware 205 and a codec (coder/decoder) 402. The network interface unit 203 is a standard interface to the PSTN 110. Codec 402 is well known in the art and serves to change digital bits into analog voice, and to receive analog voice and supply digital bits representing the analog voice.

The digital bits may then be compressed prior to transmission by using ADPCM, CELP or other such codes.

In operation, the arriving digital bits are decoded by line termination and encoder/decoder 405 and transmitted to codec 402 for conversion into an analog voice signal and transmission via the network interface unit 203 to the PSTN. Audio signals traveling in the opposite direction are received by network interface unit 203 and converted to digital bits by codec 402, before being transferred to line termination and encoder/decoder 405 for encoding and transmission over the data network.

Additionally, the HCSS 301 and 301a contain dialer hardware 205 which is utilized to establish the link between switch 301a and telephone 106 in FIG. 3, as well as between switch 301 and telephone 108. Specifically, dialer hardware 205, as controlled by CPU 204, simply makes the local call required to connect itself through PSTN 110 to the local telephone.

It is noted that circuit card 401 is only one exemplary embodiment of a switching interface to provide a connection between PSTN 110 and data network 105. Numerous other embodiments are possible. For example, the data could arrive from data network 105 as purely digital, rather than FSK, PSK, etc. In such a case, the received digital data could be sent directly to PSTN 110, via NIU 203 for output to a T1 connection, without even using a codec. Of course, initial data processing, such as stripping of packet headers, etc. would need to be performed by modem 405 and NIU 203. Other examples of varying data formats utilized by data network 105 and PSTN 110 are also possible.

In other embodiments, the long distance connection may be implemented over a leased line, or other such minimal cost or toll free connection. In any event, by replacing the long distance call with two local calls and a lower cost long distance link, substantial charges may be saved.

Other variations of the invention include a full integration of data and voice capability by allowing a user to fully utilize the Internet and the telephone system. Specifically, one can construct a data to voice switching facility whereby two users communicating via their computers over the Internet can change to a voice connection over the telephone network. A product called Voiceview by Radish Communications allows a user to change a computer's modem output between voice and data. Such a product is useful in implementing the present embodiment.

For purposes of explanation herein, consider a first user who has computer 104 and telephone 106 in his office, and a second user with computer 103 and telephone 107 in his office. The users are remote from one another and are engaged in a typical data exchange over the Internet between their computers 103 and 104, or other computers on the network, as is known in the art.

Presuming that the exchange of data prompts one of the users to desire a voice conversation, the user highlights information on his screen which is indicative of the other user. The information may be a telephone number, an Internet address which the computer can convert into a telephone number, a name, or any other information which identifies the other user. The user of computer 104 then selects the information which causes a signal to be transmitted via data network 105 to hybrid call setup switch 101. A voice connection is then made between the appropriate telephones as previously described herein.

As long as the party desiring the telephone connection has a computer connected to the data network, that party need not have the second party's telephone number. The data network, preferably hybrid call setup switch 101, can map the second party's name, data network address, etc., to a telephone number through a simple table look-up process, or a database search or query, easily implemented by an ordinary programmer. The database query can use data stored at HCSS 301 or on any other computer in the data network, and portions of the data could even be stored on different computers in data network 105.

Another enhancement is especially suitable in situations where the local user's digital telephone is part of the PC and is connected to both the Internet and the public switched telephone network. In such a case, the PC can decide if the call should be made directly through the telephone network or through a callback procedure, choosing the least expensive technique.

In an alternative embodiment, the data network 105 may itself be used as part of the path to establish the voice connection. Referring to the example of FIG. 3, if computer 104 has audio capability, then the system can utilize a voice path from computer 104, through data network 105 to HCSS switch 301, over PSTN 110 to telephone 108. Thus, if the economics are such to justify such an arrangement, data network 105 can be used for a first portion of the voice connection, and PSTN 110 can be used for a different portion thereof. Of course, the format of the voice signal must be converted at the appropriate switching points so that it can be transmitted over either the PSTN 110 or data network 105, as the case may be.

While the above describes the preferred embodiments of the invention, it can be appreciated that various other modifications and/or additions will be apparent to those of ordinary skill in the art. For example, any means of communicating to a remotely located switch capable of connecting to the telephone may be used. Such additional method should be inexpensive enough to justify the cost savings associated with having the call be made in one direction as opposed to the other direction. Such modifications and/or additions are intended to be covered by the following claims.

I claim:

1. In a communications system having a telephone network and a separate second network, a method of completing a telephone call from a calling terminal having a first telephone number to a called terminal having a second telephone number via a switch over the telephone network, the switch having a first address on said separate second network and a second address on said telephone network, comprising:

transmitting over said separate second network using said first address to said switch, a single request for said call from said calling terminal, said request including both said first telephone number and said second telephone number;

selecting, at the calling terminal, which of said first or second numbers should be dialed first;

sending information indicative of which of said first or second telephone numbers should be dialed first from the calling terminal to said switch over said second network;

receiving, at the switch, said request and said information;

forming a connection between said calling terminal and said called terminal through said telephone network in response to said request and said information by dialing said first telephone number and said second telephone number in an order as selected at said calling terminal.

2. The method of claim 1 wherein said transmitting is performed from a personal computer.

3. The method of claim 2 wherein said personal computer is connected to both a data network and a telephone network.

4. The method of claim 2 further comprising the steps of:

transmitting a message from said switch to said personal computer; and displaying on said personal computer information indicative of the state of the called telephone.

5. A method of completing a telephone call from a first terminal having a first telephone number to a second terminal having a second telephone number comprising:

transmitting over a data network from said first terminal digital signals including both said first telephone number and said second telephone number to at least two switches at different locations, the digital signals instructing each switch to establish a telephone connection to said first terminal and said second terminal respectively;

selecting, at said first terminal, which of said two telephone numbers should be dialed first;

sending information indicative of which of said first or second telephone numbers should be dialed first from the calling terminal to said two switches over said data network;

forming said each telephone connection in an order as selected at said first terminal; and connecting the two switches via a telephone network.

6. The method of claim 5 wherein said step of transmitting comprises transmitting at least one of said digital signals from at least one of said switches to at least a second one of said switches.

* * * * *